United States Patent
Kashyap et al.

(10) Patent No.: US 10,164,522 B2
(45) Date of Patent: Dec. 25, 2018

(54) SELECTIVE RESPONSE CONTROL OF DC-DC CONVERTERS IN MILD HYBRID ELECTRIC VEHICLES

(71) Applicants: Amshumaan R. Kashyap, Rochester Hills, MI (US); Sricharan Maruneni, Rochester Hills, MI (US); Oliver Gross, Oxford, MI (US)

(72) Inventors: Amshumaan R. Kashyap, Rochester Hills, MI (US); Sricharan Maruneni, Rochester Hills, MI (US); Oliver Gross, Oxford, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/271,808

(22) Filed: Sep. 21, 2016

(65) Prior Publication Data

US 2018/0079314 A1    Mar. 22, 2018

(51) Int. Cl.
*B60L 11/04* (2006.01)
*H02M 3/04* (2006.01)
(Continued)

(52) U.S. Cl.
CPC .............. *H02M 3/04* (2013.01); *B60K 6/485* (2013.01); *B60L 3/0023* (2013.01); *B60L 11/14* (2013.01);
(Continued)

(58) Field of Classification Search
USPC .................................................. 307/9.1, 10.1
See application file for complete search history.

(56) References Cited

U.S. PATENT DOCUMENTS

| | | |
|---|---|---|
| 5,373,195 A | 12/1994 | De et al. |
| 6,445,169 B1 | 9/2002 | Schultz et al. |

(Continued)

FOREIGN PATENT DOCUMENTS

| | | |
|---|---|---|
| CN | 102545573 A | 7/2012 |
| CN | 104092635 A | 10/2014 |

(Continued)

OTHER PUBLICATIONS

Rassem R. Henry, Bruno Lequesne, Shaotang Chen, Jeffrey J. Ronning and Yanhong Xue, Belt-Driven Starter-Generator for Future 42-Volt Systems, Society of Automotive Engineers, Inc., SAE International, Mar. 5-8, 2001, SAE Technical Paper Series 2001-01-0728, 42 Volt Technology (SP-1619), 14 pages.

(Continued)

*Primary Examiner* — Daniel Kessie
(74) *Attorney, Agent, or Firm* — Ralph E. Smith

(57) ABSTRACT

A control system for a mild hybrid vehicle is configured to detect whether a main contactor is open, the main contactor being connected between a primary battery system and a bi-directional direct current to direct current (DC-DC) converter and in response to detecting that the main contactor is open: command the DC-DC converter to operate in a boost mode to excite a motor-generator unit (MGU), after the excitation of the MGU has completed, command the DC-DC converter to operate in a buck mode, determine a previous voltage regulation feedback setpoint for the DC-DC converter, and control the DC-DC converter to maintain a voltage of the secondary battery system within a desired range by inserting a delay to a voltage control loop of the DC-DC converter such that the voltage control loop mimics a bandwidth of the MGU.

20 Claims, 3 Drawing Sheets

(51) Int. Cl.
  *B60L 11/18* (2006.01)
  *B60K 6/485* (2007.10)
  *B60W 20/50* (2016.01)
  *B60L 3/00* (2006.01)
  *B60L 11/14* (2006.01)
  *B60W 50/029* (2012.01)
  *H02M 1/00* (2006.01)

(52) U.S. Cl.
  CPC .......... *B60L 11/1811* (2013.01); *B60W 20/50* (2013.01); *B60L 2210/12* (2013.01); *B60L 2210/14* (2013.01); *B60W 2050/0297* (2013.01); *H02M 2001/0025* (2013.01); *Y10S 903/906* (2013.01)

(56) References Cited

U.S. PATENT DOCUMENTS

| | | |
|---|---|---|
| 6,978,854 B1 | 12/2005 | Kuang et al. |
| 7,436,080 B2 | 10/2008 | Hackl et al. |
| 7,961,449 B2 | 6/2011 | Kaster et al. |
| 8,020,650 B2 | 9/2011 | Maanen et al. |
| 8,064,227 B2 | 11/2011 | Namuduri et al. |
| 8,140,205 B2 | 3/2012 | Hanyu et al. |
| 8,314,578 B2 | 11/2012 | Namuduri et al. |
| 8,606,447 B2 | 12/2013 | Namuduri et al. |
| 2007/0120530 A1* | 5/2007 | Nozaki .............. B60L 3/0046 320/130 |
| 2009/0261796 A1* | 10/2009 | Ito ...................... H02M 3/1582 323/285 |
| 2010/0181828 A1* | 7/2010 | Handa ...................... B60L 7/16 307/9.1 |
| 2010/0225258 A1 | 9/2010 | Namuduri et al. |
| 2012/0268085 A1 | 10/2012 | Lee et al. |
| 2013/0066499 A1 | 3/2013 | Niste et al. |
| 2014/0001768 A1* | 1/2014 | Moriya ............... F02N 11/0814 290/38 A |
| 2014/0045648 A1* | 2/2014 | Bangura ............... F02N 11/006 477/3 |
| 2014/0046520 A1 | 2/2014 | Katoch et al. |
| 2015/0019055 A1* | 1/2015 | Nie ........................ B60R 16/03 701/22 |
| 2015/0251544 A1* | 9/2015 | Sugiyama ................ B60L 1/00 307/10.6 |
| 2015/0353035 A1* | 12/2015 | Ferrel ..................... H02M 3/04 307/9.1 |
| 2016/0226253 A1* | 8/2016 | Abido ..................... H02J 3/383 |
| 2016/0273462 A1* | 9/2016 | Suzuki ................. B60W 20/00 |

FOREIGN PATENT DOCUMENTS

| | | |
|---|---|---|
| EP | 1719894 A2 | 11/2006 |
| WO | 2016/043071 A1 | 3/2016 |

OTHER PUBLICATIONS

Stable Operation of DC-DC Converters with Power/Platform Management Devices Closed Loop Trim, Lattice Semiconductor Corp., Oct. 2014, Application Note AN6077, 8 pages.

International Search Report and Written Opinion dated Dec. 6, 2017 for International Application No. PCT/US2017/050596, International Filing Date Sep. 8, 2017.

* cited by examiner

SELECTIVE RESPONSE CONTROL OF DC-DC CONVERTERS IN MILD HYBRID ELECTRIC VEHICLES

FIELD

The present application generally relates to mild hybrid electric vehicles and, more particularly, to systems and methods for selective response control of direct current to direct current (DC-DC) converters in a mild hybrid electric vehicle.

BACKGROUND

One type of hybrid electric vehicle (HEV), commonly referred to as a mild hybrid vehicle or mild HEV, includes an engine and a belt-driven starter generator (BSG) unit. The BSG unit includes a battery system (e.g., 48 volts) that supplies a current to drive an electric motor, which in turn drives a crankshaft of the engine via a belt to assist in starting or restarting the engine. This enables the engine, for example, to be periodically turned off during certain operating periods and then quickly restarted when drive torque is required. This is also commonly referred to as engine start/stop engine operation. Such operation provides for increased fuel economy. The BSG unit is also configured to convert torque generated by the engine at the crankshaft to electrical energy for powering or recharging components, such as the battery system of the BSG unit.

A DC-DC converter is optionally implemented to step-down the voltage of the battery system to a lesser voltage (e.g., 12 volts) for recharging another battery (e.g., a lead-acid battery) that powers vehicle accessory loads and/or for directly powering the vehicle accessory loads. When a main contactor of the battery system opened due to a fault condition, the DC-DC converter requires an input voltage to continue operation of the vehicle. Conventional mild hybrid vehicle control systems implement additional power modules (e.g., capacitors) to provide this input voltage during main contactor faults. Such modules, however, are very expensive. Accordingly, while such mild hybrid vehicle control systems work for their intended purpose, there remains a need for improvement in the relevant art.

SUMMARY

According to one aspect of the invention, a method for controlling a mild hybrid vehicle is presented. In one exemplary implementation, the method comprises: detecting, by a control system of the mild hybrid vehicle, whether a main contactor is open, the main contactor being connected between a primary battery system and a bi-directional direct current to direct current (DC-DC) converter, the DC-DC converter being further connected to a secondary battery system; and in response to detecting that the main contactor is open: commanding, by the control system, the DC-DC converter to operate in a boost mode to excite a motor-generator unit (MGU), the MGU being coupled to a crankshaft of the engine by a belt and connected to the DC-DC converter; after the excitation of the MGU has completed, commanding, by the control system, the DC-DC converter to operate in a buck mode; determining, by the control system, a previous voltage regulation feedback setpoint for the DC-DC converter; and controlling, by the control system, the DC-DC converter to maintain a voltage of the secondary battery system within a desired range by inserting a delay to a voltage control loop of the DC-DC converter such that the voltage control loop mimics a bandwidth of the MGU.

In some implementations, the method further comprises storing, by the control system, a current voltage regulation feedback setpoint for the DC-DC converter. In some implementations, the current voltage regulation feedback setpoint is retrieved as the previous voltage regulation feedback setpoint during a subsequent cycle. In some implementations, the delay is a predetermined delay. In some implementations, the delay is approximately 1-2 milliseconds.

In some implementations, the method further comprises in response to the excitation of the MGU completing, commanding, by the control system, the DC-DC converter to operate in an idle mode for an idle period. In some implementations, the control system commands the DC-DC converter to operate in the buck mode after the idle period.

In some implementations, the method further comprises receiving, by the control system, a fault signal indicative of the open main contactor. In some implementations, the primary voltage is approximately 48 volts and the secondary voltage is approximately 12 volts. In some implementations, the desired range is from approximately 11 volts to 13.5 volts.

According to another aspect of the invention, a mild hybrid vehicle is presented. In one exemplary implementation, the vehicle comprises: a primary battery system associated with a primary voltage; a secondary battery system associated with a lesser secondary voltage; a DC-DC converter connected between the primary and secondary battery systems; an engine configured to rotatably drive a crankshaft; an MGU connected to the DC-DC converter and the primary battery system and coupled to the crankshaft by a belt; a main contactor (a) connected between (i) the primary battery system and (ii) the DC-DC converter and the MGU and (b) configured to open in response to a fault, thereby disconnecting the DC-DC converter from the primary battery system; and a control system configured to, in response to detecting that the main contactor is open: command the DC-DC converter in a boost mode to excite the MGU; after the excitation of the MGU has completed, command the DC-DC converter to operate in a buck mode; determining, by the control system, a previous voltage regulation feedback setpoint for the DC-DC converter; and controlling, by the control system, the DC-DC converter to maintain a voltage of the secondary battery system within a desired range by inserting a delay to a voltage control loop of the DC-DC converter such that the voltage control loop mimics a bandwidth of the MGU.

In some implementations, the control system is further configured to store a current voltage regulation feedback setpoint for the DC-DC converter. In some implementations, the current voltage regulation feedback setpoint is retrieved as the previous voltage regulation feedback setpoint during a subsequent cycle. In some implementations, the delay is a predetermined delay. In some implementations, the delay is approximately 1-2 milliseconds.

In some implementations, the control system is further configured to in response to the excitation of the MGU completing, command the DC-DC converter to operate in an idle mode for an idle period. In some implementations, the commanding of the DC-DC converter to operate in the buck mode occurs after the idle period.

In some implementations, the control system is further configured to receive a fault signal indicative of the open main contactor. In some implementations, the primary voltage is approximately 48 volts and the secondary voltage is approximately 12 volts. In some implementations, the desired range is from approximately 11 volts to 13.5 volts.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously mentioned, conventional mild hybrid vehicle control systems implement additional power modules (e.g., capacitors) that increase costs and a weight of the vehicle. The purpose of these additional power modules is to be able to selectively provide a direct current to direct current (DC-DC) converter with an input voltage so that the DC-DC converter is always able to maintain a voltage of a secondary battery system (e.g., a 12 volt lead-acid battery) within a desired range. One scenario where this is necessary is when a main contactor associated with a primary voltage system (e.g., a 48 volt lithium-ion battery pack) opens, such as due to a fault or malfunction, Instead of using additional power modules, the systems and methods presented herein utilize a bi-directional or "buck-to-boost" (B2B) DC-DC converter. This bi-directional DC-DC converter is configured to operate in a boost mode to excite a motor generator unit (MGU) coupled to an engine crankshaft, and then switch to a buck mode to step-down an input voltage provided by the MGU to maintain the voltage of the secondary battery system within the desired range. The switching frequency/bandwidths of the MGU and the bi-directional DC-DC converter, however, are different. Specifically, the controller switching frequency for the MGU is much lower (e.g., approximately 20 kilohertz) compared to the controller switching frequency for the bi-directional DC-DC converter (e.g., approximately 600 kilohertz).

This difference in operational bandwidths, in some operating scenarios, causes the DC-DC converter to perform unnecessary switching during its voltage control loop. This furthers lead to the voltage of the secondary battery system going outside of the desired range (e.g., voltage overshoots and undershoots). Such operations may damage or weaken the secondary battery system over time, and unnecessary switching also increases power losses. Accordingly, the systems and methods of the present disclosure introduce a delay to the voltage control loop of the DC-DC converter such that it mimics the bandwidth of the MGU. By doing so, switching losses are decreased and the voltage of the secondary battery system is maintained within the desired range.

Figure 1:
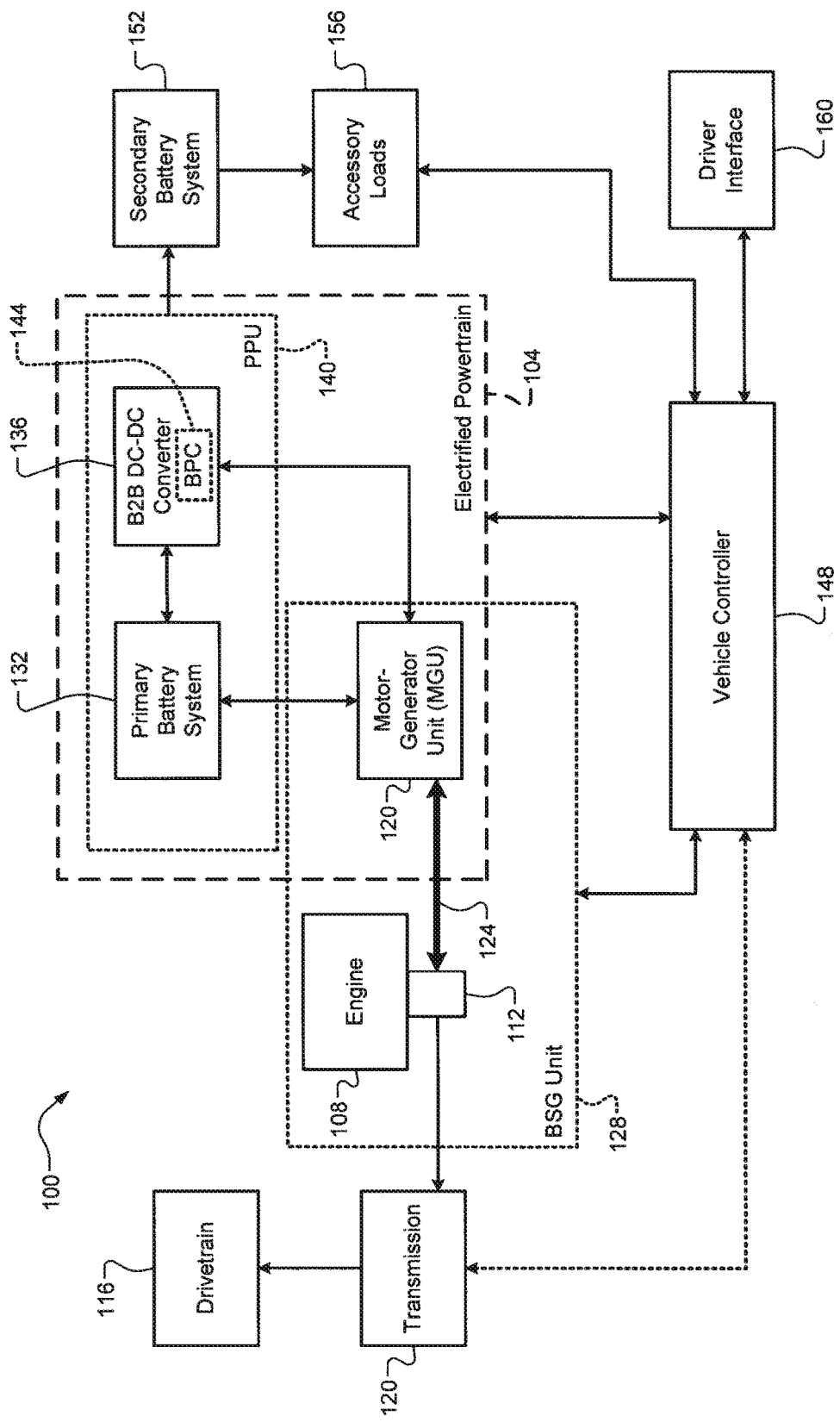
FIG. 1 is a functional block diagram of an exemplary mild hybrid vehicle according to the principles of the present disclosure.

Referring now to FIG. 1, a diagram of an exemplary mild hybrid vehicle 100 is illustrated. The term "mild hybrid vehicle" as used herein refers to any mild hybrid or mild hybrid electric vehicle (HEV) that utilizes both an engine and an electric power source (e.g., an electric motor) during operation. The vehicle 100 includes an electrified powertrain 104 and an engine 108. The engine 108 is configured to compress and combust a mixture of air and fuel (e.g., gasoline) within cylinders (not shown) to generate drive torque at a crankshaft 112. The drive torque at the crankshaft 112 is transferred to a drivetrain 116 (e.g., wheels) via a transmission 120. The electrified powertrain 104 includes an MGU 120 that is coupled to the crankshaft 112 via a belt 124.

The engine 104, the MGU 120, and the belt 124 collectively form a belt-drive starter generator (BSG) unit 128. One example of the MGU 120 is an induction motor (e.g., a three-phase rectifier). The electrified powertrain 104 further includes a primary battery system 132 and a bi-directional or "B2B" DC-DC converter 136 (hereinafter, "DC-DC converter 136"). The primary battery system 132 and the DC-DC converter 136 collectively represent a power pack unit (PPU) 140. One example of the primary battery system 132 is a 48 volt lithium ion battery pack. In some implementations, the DC-DC converter 136 includes an on-board battery pack controller (BPC) 144. While the BPC 144 is shown, it will be appreciated that its functionality may also be performed by a vehicle controller 148. The vehicle controller 148 and the optional BPC 144 are collectively referred to as a control system of the vehicle 100.

The vehicle 100 further includes a secondary battery system 152 (e.g., a 12 volt lead acid battery) and accessory loads 156 that are powered by the secondary battery system 152. The PPU 140 also recharges the secondary battery system 152. Examples of the accessory loads 156 are a heating, ventilating, and cooling (HVAC) system (e.g., an air conditioner) and a multimedia or infotainment system. The vehicle controller 148 controls the electrified powertrain 104 and the BSG unit 128. The vehicle controller 148 also controls the accessory loads 156 and communicates with a driver interface 160 that includes various components (an accelerator pedal, a display, etc.).

Figure 2:
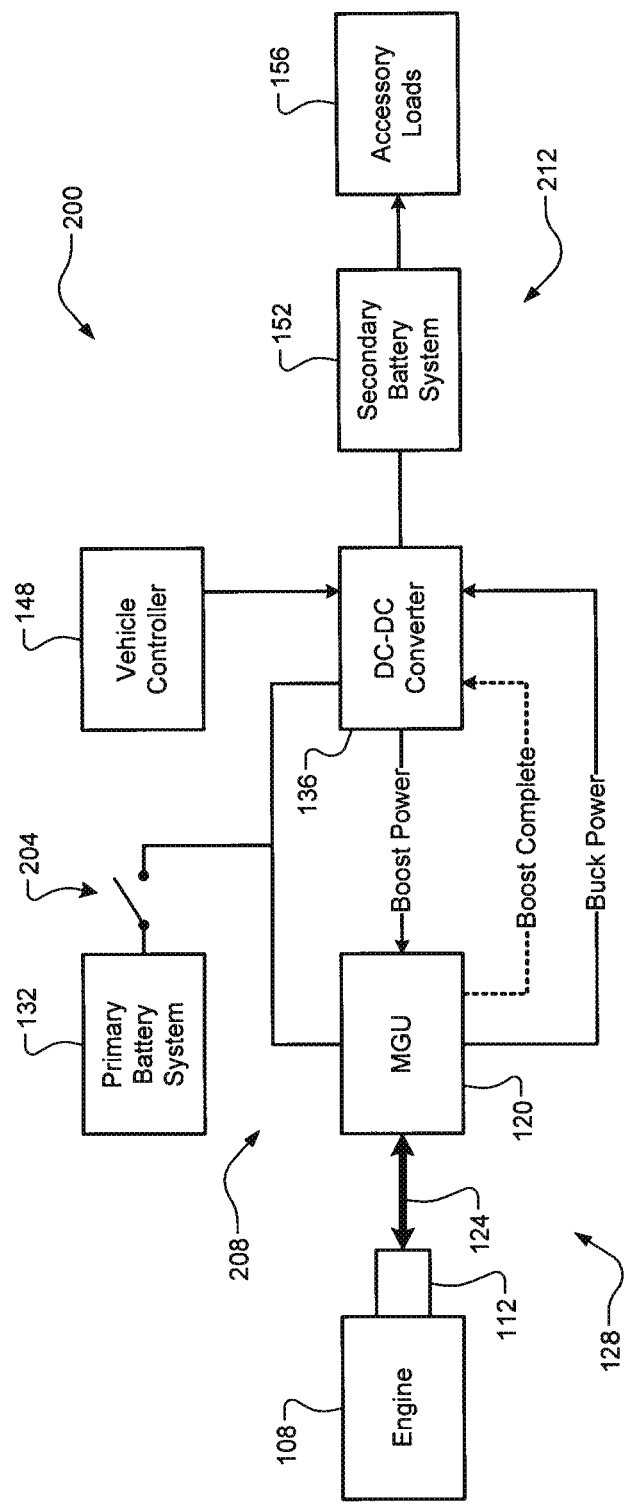
FIG. 2 is a functional block diagram of an exemplary electrical system of a mild hybrid vehicle according to the principles of the present disclosure.

Referring now to FIG. 2, a diagram of an exemplary electrical system 200 of the vehicle 100 is illustrated. The electrical system 200 includes MGU 120, the primary battery system 132, the DC-DC converter 136, the secondary battery system 152, and the accessory loads 156. In one exemplary implementation, the electrical system 200 is described as including the engine 108, the crankshaft 112, and the belt 124 (as part of the BSG unit 128, which includes the MGU 120) and the vehicle controller 148. The electrical system 200 further includes a main contactor 204 (e.g., a high-voltage switch) in a high voltage bus 208 that connects the MGU 120, the primary battery system 132, and the DC-DC converter 136. The main contactor 204 is thus configured to open/close to disconnect/connect the primary battery system 132 to the DC-DC converter and the MGU 120. It will be appreciated that the electrical system 200 may also be shown to include other components (e.g., the driver interface 160).

The main contactor 204 is configured to open due to a fault or malfunction. For example, in one implementation the vehicle controller 148 attempts to close the main contactor 204 at vehicle startup, but a fault or malfunction of the main contactor 204 prevents this from occurring. A signal or digital flag is received by the vehicle controller 148 that is indicative of such a fault condition. When the main contactor 204 is open, however, the primary battery system 132 is unable to power the MGU 120. Thus, start/stop operation of the engine 108 using the BSG unit 128 is be temporarily unavailable. A notification of the disabling of start/stop operation, in one exemplary implementation, is provided to a driver via the driver interface 156. Additionally, recharging of the secondary battery system 152 may be temporarily unavailable, which would affect or prevent operation of the accessory loads 156 via a low voltage bus 212.

Figure 3:
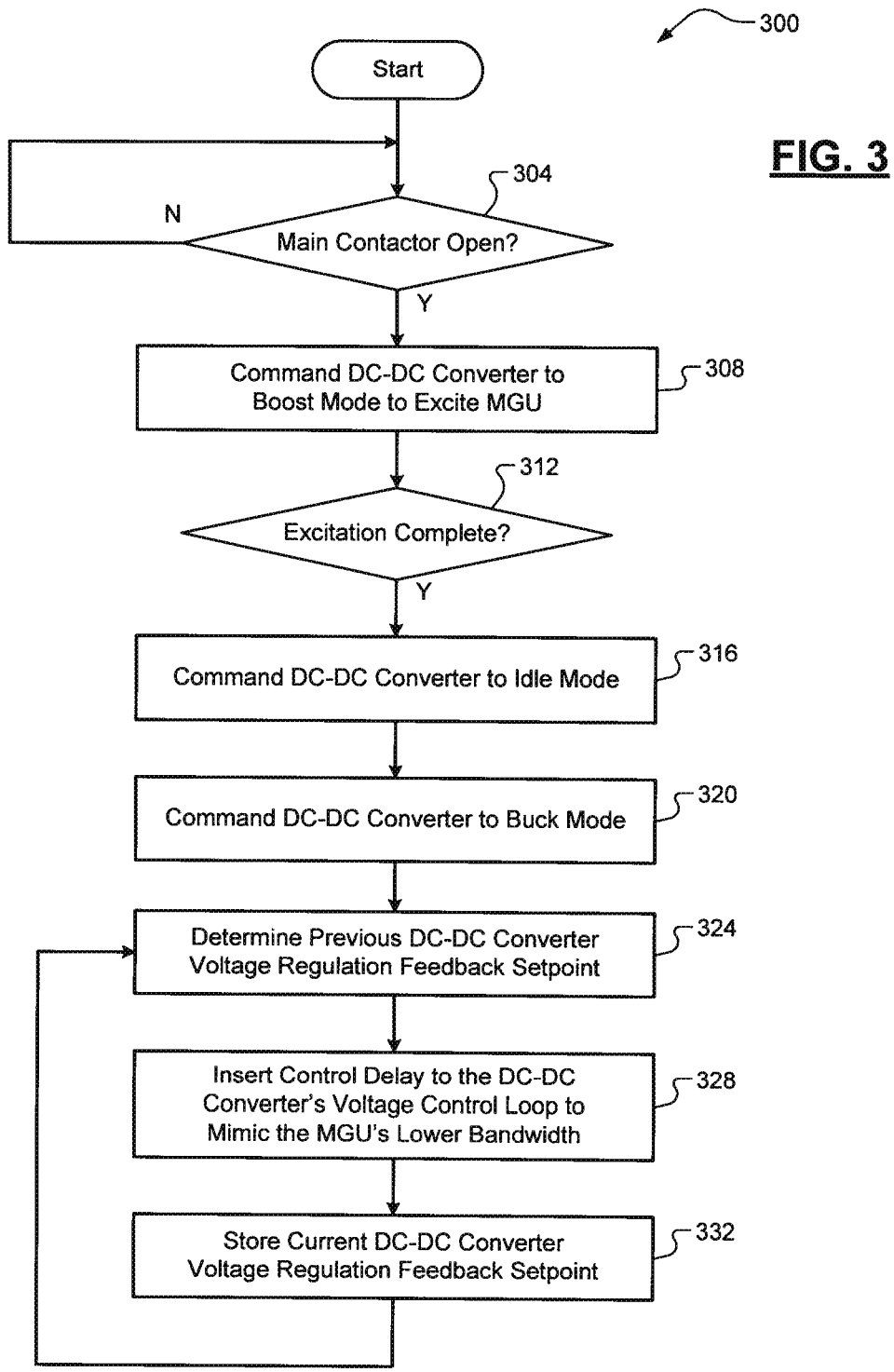
FIG. 3 is a flow diagram of an exemplary method for selective response control of a direct current (DC) to DC converter of a mild hybrid vehicle according to the principles of the present disclosure.

Referring now to FIG. 3 and with continued reference to FIG. 2, an example method 300 for selective response control of the DC-DC converter 136 is illustrated. As previously discussed, the disconnection of the primary battery system 132 from the DC-DC converter 136 also prevents the primary battery system 132 being used (e.g., stepped down) for recharging the secondary battery system 152 via the DC-DC converter 136. Thus, at 304, the vehicle controller 148 determines whether the main contactor 204 is open. As previously discussed, this happens, for example, after a failed attempt to close the main contactor 204 due to a fault or malfunction. If the main contactor 204 is open, the method 300 proceeds to 308. Otherwise, the method 300 continues normal operation and ends or returns to 304. Normal operation includes the primary battery system 132 providing a high voltage (e.g., 48 volts) to the DC-DC converter 136, which then steps down this high voltage to a lower voltage (e.g., 12 volts) for recharging the secondary battery system 152.

At 308, the vehicle controller 148 commands the DC-DC converter 136 to operate in a boost mode. During this boost mode, the DC-DC converter 136 draws power from the secondary battery system 152 (the low voltage bus 212) to provide boost power (see "boost power" in FIG. 2) to the MGU 120. The purpose of providing this boost power to the MGU is to excite the MGU 120 or, in other words, to cause the MGU 120 to begin drawing power from the engine 108 via the crankshaft 112 and the belt 124. Excitation of the MGU 120 as discussed herein includes, for example, the high voltage bus 208 reaching a desired voltage (e.g., 48 volts) and the voltage of the high voltage bus 208 being held for a hold period. This further includes, in one exemplary implementation, holding the high voltage bus 208 at a slightly higher voltage than the desired voltage for priming the MGU 120 (e.g., a stator) and sustaining a magnetic field. At 312, the vehicle controller 148 determines whether this excitation has completed. The determination by the vehicle controller 148 that the excitation has completed is made, for example, upon receiving a notification signal from the MGU 120 (see "boost complete" in FIG. 2).

When excitation has completed, the method 300 proceeds to 316. When excitation has yet to complete, the method 300 returns to 312. At 316, the vehicle controller 148 commands the DC-DC converter to operate in an idle mode for an idle period. During this idle mode, the DC-DC converter is neither drawing nor outputting power. This idle period prevents potential issues that may be caused by immediate switching between boost/buck operation of the DC-DC converter 136. After the idle mode/period, the vehicle controller 148 commands the DC-DC converter 136 to operate in a buck mode at 320. During this buck mode, the DC-DC converter 136 is drawing power (see "buck power" in FIG. 2) from the MGU 120 (the high voltage bus 208) to provide boost power for recharging the secondary battery system.132. At 324, the vehicle controller 148 determines a previous voltage regulation feedback setpoint for the DC-DC converter 136. The term "voltage regulation feedback setpoint" as used herein refers to the instantaneous value fed to a voltage control loop for the DC-DC converter 136 to regulate/maintain. This previous setpoint is retrieved, for example, from a memory of the vehicle controller 148.

At 328, the vehicle controller 148 inserts a delay to the voltage control loop to mimic the lower bandwidth of the MGU 120 (e.g., 10 hertz). For example only, at a first time (time t=0 seconds), the voltage regulation feedback setpoint is 13.2 volts. At a subsequent time (time t=0+x seconds, where x is a microsecond sampling value), the voltage regulation feedback setpoint is, for example, 13.6 volts. In this example, the previous voltage feedback setpoint would be 13.2 volts (time t=0) and the delay would be x milliseconds, which would cause the current or instantaneous voltage feedback setpoint for the voltage control loop of the DC-DC converter 136 to be 13.2 volts at the subsequent time (t=0+x seconds). The value of this delay depends on the configuration of the vehicle 100 (e.g., the bandwidths of the MGU 120 and the DC-DC converter 136). For example only, the delay is approximately 1 to 2 milliseconds for a 10 hertz vs. 60 kilohertz bandwidth difference (or a 20 kilohertz versus 600 kilohertz difference in the controller switching frequencies). Finally, the voltage feedback setpoint is then be stored by the vehicle controller 148 in its memory at 332 for subsequent retrieval/usage and the method 300 returns to 324 as part of the control loop. After another delay period (e.g., another 1 to 2 milliseconds), the same action repeats at 328 and 332 where the instantaneous value is captured and then regulated to that voltage. In this way, the voltage of the low voltage bus 212 does not fall to much as to lose loop stability and maintains the integrity or stability of the closed-loop system.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. This memory also stores, for example, the voltage regulation feedback setpoints discussed herein. The one or more processors may be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:
1. A method for controlling a mild hybrid vehicle, the method comprising:
    detecting, by a control system of the mild hybrid vehicle, whether a main contactor is open, the main contactor being connected between a primary battery system and a bi-directional direct current to direct current (DC-DC) converter, the DC-DC converter being further connected to a secondary battery system; and
    in response to detecting that the main contactor is open:

commanding, by the control system, the DC-DC converter to temporarily operate in a boost mode for a first period to excite a motor-generator unit (MGU), the MGU being coupled to a crankshaft of the engine and connected to the DC-DC converter;

after the first period and when the excitation of the MGU has completed, commanding, by the control system, the DC-DC converter to operate in a buck mode;

determining, by the control system, a previous voltage regulation feedback setpoint and a current voltage regulation feedback setpoint for the DC-DC converter; and operating the DC-DC converter in the buck mode and maintaining a voltage of the secondary battery system within a desired range to prevent voltage undershoots and overshoots of the secondary battery system by:

controlling, by the control system, the DC-DC converter based on the previous voltage regulation feedback setpoint for a second period, wherein a duration of the second period is based on a difference between bandwidths of the DC-DC converter and the MGU, and after the second period, controlling, by the control system, the DC-DC converter based on the current voltage regulation feedback setpoint.

2. The method of claim 1, further comprising storing, by the control system, the current voltage regulation feedback setpoint for the DC-DC converter.

3. The method of claim 2, wherein the current voltage regulation feedback setpoint is retrieved as the previous voltage regulation feedback setpoint during a subsequent control cycle of the DC-DC converter.

4. The method of claim 1, wherein the second period is a predetermined period.

5. The method of claim 4, wherein the duration of the second period is approximately 1-2 milliseconds.

6. The method of claim 1, further comprising after the first period and in response to the excitation of the MGU completing, commanding, by the control system, the DC-DC converter to operate in an idle mode for an idle period.

7. The method of claim 6 wherein the control system commands the DC-DC converter to operate in the buck mode after the idle period.

8. The method of claim 1, further comprising receiving, by the control system, a fault signal indicative of the open main contactor.

9. The method of claim 1, wherein a primary voltage rating of the primary battery system is approximately 48 volts and a secondary voltage rating of the secondary battery system is approximately 12 volts.

10. The method of claim 9, wherein the desired range for the secondary battery system is from approximately 11 volts to 13.5 volts.

11. A mild hybrid vehicle, comprising:
a primary battery system associated with a primary voltage;
a secondary battery system associated with a lesser secondary voltage;
a bi-directional direct current to direct current (DC-DC) converter connected between the primary and secondary battery systems;
an engine configured to rotatably drive a crankshaft;
a motor-generator unit (MGU) connected to the DC-DC converter and the primary battery system and coupled to the crankshaft; and
a main contactor (a) connected between (i) the primary battery system and (ii) the DC-DC converter and the MGU and (b) configured to open in response to a fault, thereby disconnecting the DC-DC converter from the primary battery system;
a control system configured to, in response to detecting that the main contactor is open:
command the DC-DC converter to temporarily operate in a boost mode for a first period to excite the MGU;
after the first period and when excitation of the MGU has completed, command the DC-DC converter to operate in a buck mode;
determine a previous voltage regulation feedback setpoint and a current voltage regulation feedback setpoint for the DC-DC converter; and
operate the DC-DC converter in the buck mode and maintain the secondary voltage of the secondary battery system within a desired range to prevent voltage undershoots and overshoots of the secondary battery system by:
controlling the DC-DC converter based on the previous voltage regulation feedback setpoint for a second period, wherein a duration of the second period is based on a difference between bandwidths of the DC-DC converter and the MGU, and
after the second period, controlling the DC-DC converter based on the current voltage regulation feedback setpoint.

12. The vehicle of claim 11, wherein the control system is further configured to store the current voltage regulation feedback setpoint for the DC-DC converter.

13. The vehicle of claim 12, wherein the current voltage regulation feedback setpoint is retrieved as the previous voltage regulation feedback setpoint during a subsequent control cycle of the DC-DC converter.

14. The vehicle of claim 11, wherein the second period is a predetermined period.

15. The vehicle of claim 14, wherein the duration of the second period is approximately 1-2 milliseconds.

16. The vehicle of claim 11, wherein the control system is further configured to, after the first period and in response to the excitation of the MCU completing, command the DC-DC converter to operate in an idle mode for an idle period.

17. The vehicle of claim 16 wherein the commanding of the DC-DC converter to operate in the buck mode occurs after the idle period.

18. The vehicle of claim 11, wherein the control system is further configured to receive a fault signal indicative of the open main contactor.

19. The vehicle of claim 11, wherein a primary voltage rating of the primary battery system is approximately 48 volts and a secondary voltage rating of the secondary battery system is approximately 12 volts.

20. The vehicle of claim 19, wherein the desired range for the secondary battery system is from approximately 11 volts to 13.5 volts.

* * * * *